(12) United States Patent
Neft et al.

(10) Patent No.: US 12,291,005 B2
(45) Date of Patent: May 6, 2025

(54) VEHICLE GLAZING WITH METAL-BASED COATING AND COLORED EDGE REGION

(71) Applicant: SAINT-GOBAIN GLASS FRANCE, Courbevoie (FR)

(72) Inventors: Anna Neft, Herzogenrath (DE); Stephan Gillessen, Alsdorf (DE); Stefanie Pengel, Aachen (DE); Jefferson Do Rosario, Aachen (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 18/551,092

(22) PCT Filed: May 11, 2022

(86) PCT No.: PCT/EP2022/062723
§ 371 (c)(1),
(2) Date: Sep. 18, 2023

(87) PCT Pub. No.: WO2022/248219
PCT Pub. Date: Dec. 1, 2022

(65) Prior Publication Data
US 2024/0157681 A1    May 16, 2024

(30) Foreign Application Priority Data
May 26, 2021   (EP) ..................................... 21175939

(51) Int. Cl.
*B32B 17/10*    (2006.01)
*B60J 1/00*    (2006.01)
(Continued)

(52) U.S. Cl.
CPC .... *B32B 17/1066* (2013.01); *B32B 17/10036* (2013.01); *B32B 17/10201* (2013.01);
(Continued)

(58) Field of Classification Search
None
See application file for complete search history.

(56) References Cited

U.S. PATENT DOCUMENTS

| 5,620,799 A * | 4/1997 | Sauer ................... H01Q 1/1271 |
| | | 52/173.3 |
| 2014/0319116 A1* | 10/2014 | Fischer ............... C03C 17/3673 |
| | | 219/203 |

FOREIGN PATENT DOCUMENTS

| DE | 44 33 051 A1 | 3/1996 |
| DE | 199 27 683 C1 | 1/2001 |

(Continued)

OTHER PUBLICATIONS

RR International Search Report as issued in International Patent Application No. PCT/EP2022/062723, dated Jul. 4, 2022.

*Primary Examiner* — Laura C Powers
(74) *Attorney, Agent, or Firm* — Pillsbury Winthrop Shaw Pittman LLP (57) ABSTRACT

A vehicle glazing includes a first pane and a second pane which are connected to one another via a thermoplastic intermediate layer which is sectionally colored, a metal-based functional layer which is deposited on an inner surface of the first pane facing the thermoplastic intermediate layer, on the inner surface of the first pane, a coating-free edge region which is free of metal-based functional layer and extends from a side edge of the first pane over at least 5 mm to at most 25 mm on the inner surface, wherein the thermoplastic intermediate layer includes a transparent region and a colored region, the colored region being arranged at least in the entire coating-free edge region.

21 Claims, 2 Drawing Sheets

(51) Int. Cl.
*C03C 17/36* (2006.01)
*C03C 27/10* (2006.01)

(52) U.S. Cl.
CPC .... *B32B 17/1022* (2013.01); *B32B 17/10229* (2013.01); *B32B 17/10761* (2013.01); *B32B 17/10935* (2013.01); *B60J 1/001* (2013.01); *C03C 17/3642* (2013.01); *C03C 17/366* (2013.01); *C03C 17/3681* (2013.01); *C03C 27/10* (2013.01); *B32B 2605/08* (2013.01)

(56) References Cited

FOREIGN PATENT DOCUMENTS

| | | |
|---|---|---|
| DE | 10 2004 013201 A1 | 10/2005 |
| DE | 697 31 268 T2 | 9/2006 |
| DE | 10 2010 019941 A1 | 11/2011 |
| EP | 0 897 787 A2 | 2/1999 |
| EP | 0 847 965 B1 | 10/2004 |
| EP | 1 200 255 B1 | 8/2006 |
| EP | 1 917 222 B1 | 3/2009 |
| EP | 2 465 833 A1 | 6/2012 |
| WO | WO 2007/101964 A1 | 9/2007 |
| WO | WO 2010/043598 A1 | 4/2010 |
| WO | WO 2013/104439 A1 | 7/2013 |
| WO | WO 2013/131667 A1 | 9/2013 |
| WO | WO 2016/020113 A1 | 2/2016 |
| WO | WO 2016/020114 A1 | 2/2016 |

\* cited by examiner

VEHICLE GLAZING WITH METAL-BASED COATING AND COLORED EDGE REGION

CROSS-REFERENCE TO RELATED APPLICATIONS

This application is the U.S. National Stage of PCT/EP2022/062723, filed May 11, 2022, which in turn claims priority to European patent application number 21175939.4 filed May 26, 2021. The content of these applications are incorporated herein by reference in their entireties.

The invention relates to a vehicle glazing, a method for producing the glazing, and its use.

Glazing in buildings and vehicles is increasingly provided with large, electrically conductive layers that are transparent to visible light and have to fulfill certain functions. These layers are generally metal-based, i.e., have at least one layer made of a metal material, and are commonly referred to as functional layers.

For example, for reasons of saving energy and the comfort of glazing, high demands are made regarding their thermally insulating properties. It is therefore desirable to avoid a high heat input from solar irradiation which leads to excessive heating of the interior and in turn results in high energy costs for the necessary air conditioning. In particular given increasing electromobility, it is of great importance to save energy and weight which are required for heating, ventilation and air conditioning technology. It is known to provide vehicle panes with transparent electrically conductive coatings. These are typically electrically conductive coatings with IR-reflecting properties which improve the thermal comfort in the vehicle interior. In particular, it is possible to distinguish between sun protection coatings and emissivity-reducing coatings (LowE coatings). Sun protection coatings reflect portions of the solar radiation in the near infrared spectrum and prevent them from penetrating into the vehicle interior and heating same. They typically have one or more silver layers which provide the IR-reflecting properties, as known, for example, from WO 2013/104439 A1 and from DE 19927683 C1. Emissivity-reducing coatings (so-called LowE coatings) reflect radiation in a more distant IR range, in particular the thermal radiation emanating from a heated glass pane. The penetration of the thermal radiation into the interior of the vehicle is reduced which likewise causes a lower heating of the interior. In winter, the radiation of the heat from the interior to the external environment when outside temperatures are low is prevented. Transparent emissivity-reducing coatings can contain, for example, reflective layers based on indium tin oxide (ITO) or other transparent conductive oxides (TCOs) as known, for example, from WO 2013/131667 A1.

Another application of functional layers is to keep the field of view of a vehicle pane free of ice and condensation. Electric heating layers are known which cause a targeted heating of the vehicle pane by applying an electrical voltage (see, for example, WO 2010/043598 A1).

With composite panes composed of two individual panes with a thermoplastic intermediate layer arranged in between, a metal-based functional layer is often arranged between the two individual panes. The metal-based functional layer is therefore well protected from weathering and mechanical damage. However, if the metal-based functional layer at the pane rim (pane edge) is exposed, strong corrosion of the metal-based functional layer frequently occurs. In order to prevent this corrosion, the metal-based functional layer is removed in the edge region of the pane or is not applied, as known, for example, from WO 2013104439 A1, WO 2016020113 A1 and WO 2016020114 A1. The intention is therefore to prevent a diffusion of moisture through the thermoplastic intermediate layer to the metal-based functional layer, which would lead to corrosion there. The delayered edge can be seen in the finished composite pane since the transition from the layer-free region to the metal-based functional layer is visible. If this edge region of the pane lies in the visible region in the installed state, such as in the case of a side pane to be opened, this is visually very disruptive. In panes according to the prior art, a colored, usually black covering print of, for example, a ceramic color on one of the two panes of the composite pane is usually applied in this region. The delayered edge is therefore effectively concealed, as disclosed in EP 1200255 B1. However, this has the disadvantage that a ceramic covering print is often perceived as visually unattractive at exposed edges. Thermoplastic films with a colored region are known, for example, from DE 4433051 A1.

EP 2465833 A1 discloses a composite pane which has a multi-layer film arranged between the outer pane and the inner pane and which is suitable to a sufficient extent for electromagnetic radiation. The multi-layer film extends over the entire surface of the composite pane with the exception of an edge region of the composite pane. This coating-free edge region must have a width of at least 50 mm. Only with a coating-free edge region of at least 50 mm can electromagnetic radiation be transmitted through the composite pane without significant deterioration.

By contrast, the object of the present invention is to provide an improved composite pane with a metal-based functional layer, by means of which these disadvantages can be avoided, it being essential to protect the metal-based functional layer against corrosion and to reduce the resulting visual disadvantages. The glazing with the pane and the metal-based functional layer should be simple and cost-effective to produce in industrial mass production. In addition, the method for producing glazing should be easy and cost-effective to implement using established production methods for panes.

This object is achieved according to the invention by a vehicle glazing according to claim 1. A production method and the use of vehicle glazing are described in further claims. Preferred embodiments can be found in the dependent claims.

The vehicle glazing according to the invention comprises a first pane and a second pane which are connected to one another via a thermoplastic intermediate layer. The thermoplastic intermediate layer is sectionally colored. The first pane has an outer surface (I) facing the external environment and an inner surface (II) facing the thermoplastic intermediate layer, and a peripheral side edge. The second pane likewise has an inner surface (III) facing the thermoplastic intermediate layer and an outer surface (IV) facing the external environment, and a peripheral side edge. The terms "inner" and "outer" accordingly refer to the arrangement of the respective surfaces in the composite glazing.

A metal-based functional layer is arranged between the first pane and the second pane, so that it is protected against weathering and mechanical damage. The metal-based functional layer is arranged on the inner surface of the first pane facing the thermoplastic intermediate layer. Located on the inner surface of the first pane is a coating-free edge region which is free of metal-based functional layer and extends from a side edge of the first pane over at least 5 mm to at most 25 mm on the inner surface. No metal-based functional layer is arranged in this coating-free edge region. A corrosion-related degradation of the metal-based functional layer can thereby be significantly reduced. The metal-based functional layer begins directly adjacent to the coating-free edge region. The term "edge region" designates a surface region on an inner surface of a pane which is arranged at the edge of the pane. The edge region of the pane extends as far as the side edge of the pane.

The thermoplastic intermediate layer is sectionally colored. The thermoplastic intermediate layer is therefore colored in a partial region. It comprises a transparent region and a colored region. The colored region is arranged at least in the entire coating-free edge region. This means that the colored region of the thermoplastic intermediate layer and the coating-free edge region are arranged to overlap, i.e. lie one above the other in a vertical view through the pane. The transition between the coating-free edge region and the metal-based functional layer can therefore be covered by the colored region. The term "colored" means that the presence of dyes in the colored region of the thermoplastic intermediate layer reduces the light transmittance through the thermoplastic intermediate layer compared to the transparent region of the thermoplastic intermediate layer.

The lower limit of 5 mm represents the minimum extent of the coating-free edge region, which is required to protect the metal-based functional layer sufficiently against corrosion. The upper limit of 25 mm represents the maximum extent of the coating-free edge region, with which a time-consuming delayering from the first pane with a high outlay in terms of material and costs can be avoided. With an extent of over 25 mm, a higher proportion of the colored region of the thermoplastic intermediate layer is also necessary. However, larger colored regions of thermoplastic layers are associated with higher costs since, for example, several times more colorant must be used.

The metal-based functional layer can consist of a single layer or ply formed of the same material, it being equally possible for it to consist of a plurality of individual layers or plies formed of at least two different materials. The metal-based functional layer can therefore consist of a single layer or ply formed of the same material. Alternatively, the metal-based functional layer can consist of a plurality of individual layers or plies formed of at least two different materials. It is common practice to form a metal-based functional layer in the form of a layer system composed of individual layers that are different from one another.

In a preferred embodiment, the colored region extends from the side edge of the first pane beyond the coating-free edge region. Measured from the side edge, the colored region preferably extends over up to 150 mm. The colored band has a positive glare protection effect for the vehicle occupant. The distance to the side edge or the width of a region is measured in the plane of the surface of the pane. The distance is in each case the shortest possible connection between the side edge and the corresponding region. Measured from the side edge, the colored region preferably extends over up to 100 mm on the first pane, particularly preferably over up to 75 mm. The transition from metal-based functional layer to the coating-free edge region is therefore prevented from having a disruptive effect on the overall visual impression of the pane, since it is located at the outer edge of the glazing. Moreover, an additional shadow effect for the vehicle occupant is generated by the colored region.

In a preferred embodiment, the colored region consists of a uniformly colored region and a variably colored region. In this case, the uniformly colored region directly adjoins the side edge, i.e. it begins directly at the pane edge. The uniformly colored region preferably extends exactly up to the transition of the coating-free edge region to metal-based functional layer. In this case, the uniformly colored region and the coating-free region are arranged congruently. The transition is therefore particularly well concealed since only the transition to the uniformly colored region is perceived. Alternatively, the uniformly colored region preferably extends beyond the coating-free edge region.

Uniformly colored means that the light transmission in the entire uniformly colored region is unchanged, i.e. homogeneous. Variably colored means that the light transmission in the variably colored region is variable, that is to say inhomogeneous. Preferably, the light transmission from the side edge increases in the direction of the center of the pane, i.e. the thermoplastic layer is becomes more transparent towards the center of the pane. The increase in light transmission from the side edge to the center of the pane is preferably linear. This produces a visually pleasing transition from the dark-colored edge to the transparent center of the pane.

In a further preferred embodiment, the colored region consists only of a uniformly colored region which is preferably arranged congruently with the coating-free edge region. This is particularly simple in terms of production since a homogeneous dye concentration and dye distribution can easily be realized. This can also be done, for example, by joining together colored and transparent film.

In an alternative preferred embodiment, the colored region consists of a variably colored region that extends beyond the coating-free edge region, the light transmission increasing, preferably increasing linearly, by the variably colored region from the side edge to the center of the pane.

The thermoplastic layer has at least one dye in the colored region. The dye can be, for example, an ink or a color pigment. An advantage in particular of organic inks with respect to, in particular, inorganic pigments is their easier distributability. However, organic inks are not as stable as inorganic pigments and age more quickly. Inorganic pigments, however, have a greater tendency to agglomerate than organic inks. Inks or color pigments suitable for the respective application are known to a person skilled in the art, and therefore they will not be discussed in greater detail below. The color concentration at a specific position in the thermoplastic intermediate layer determines the light transmission at this point.

The thermoplastic intermediate layer comprises a colored region and a transparent region. The thermoplastic intermediate layer can also comprise more than one colored region and/or more than one transparent region. Preferably, the thermoplastic intermediate layer consists of a cohesive transparent region and a colored region, or a cohesive transparent region and a plurality of colored regions. The cohesive transparent region is preferably arranged in this case in a central region of the glazing and corresponds to the region through which a viewer looks (see-through region).

Preferably, the coating-free edge region on the inner surface of the first pane extends from the side edge over at least 5 mm to at most 20 mm, particularly preferably at least 6 mm to at most 15 mm, very particularly preferably at least 7 mm to at most 10 mm. Such an edge region offers sufficient corrosion protection for the metal-based functional layer without additional measures, the functional layer being only slightly reduced due to the delayering.

The glazing according to the invention comprises a peripheral pane edge. The pane edge is composed of the two side edges of the first pane and the second pane and the thermoplastic intermediate layer arranged in-between.

In a preferred embodiment, the colored region of the thermoplastic intermediate layer is arranged sectionally along the peripheral pane edge. In this case, particularly the section or sections are provided with the arrangement according to the invention of the colored region, which in the installed state correspond to the visible, exposed sections. With a free-standing vehicle side pane, these are, for example, the upper edge section pointing towards the roof of the vehicle and optionally the lateral edge sections. With a vehicle side pane to be opened, this is the upper edge section pointing towards the roof. A colored region is not necessary along the sections which, in the installed state, are concealed by frames or covering prints, since the transition from metal-based functional layer to the functional-layer-free edge region is no longer visible in the installed state. The coating-free edge region is preferably arranged along the entire peripheral pane edge in order to prevent corrosion.

In an alternative preferred embodiment, the coating-free edge region and the colored region of the thermoplastic intermediate layer extend peripherally along the entire peripheral pane edge. This offers good corrosion protection and is visually advantageous, and is easy to produce depending on the delayering method.

The colored region is preferably strip-shaped and preferably has the form of a strip or band with a constant width in an edge section. This is readily producible in terms of process technology and is aesthetically advantageous in comparison to a strip with changing width. The same applies to the embodiment of the coating-free edge region.

The glazing comprises a first pane which has a metal-based functional layer and a protective layer on an inner side. The second pane or both panes can also be provided on the inner side with a metal-based functional layer and a protective layer.

Within the meaning of the present invention, "transparent" means that the total transmittance of the pane and in particular of the glazing corresponds to the legal stipulations for windshields and front side panes, and preferably its permeability for visible light (in the spectral range from 380 nm to 780 nm) is more than 70% and in particular more than 75%. For rear side panes and rear windshields, "transparent" can also mean 15% to 70% light transmittance. Correspondingly, "opaque" means a light transmittance of less than 15%, preferably less than 5%, in particular 0%.

The metal-based functional layer can in principle be designed in any way. It is preferably an electrically conductive coating which is transparent to visible light and comprises at least one layer made of a metal.

The metal-based functional layer is preferably applied to the pane over a large area. The metal-based functional layer is arranged at least on the inner surface of the first pane and covers or overlies the surface of the first pane completely or partially, but preferably over a large area. The term "large-area" means that at least 50%, at least 60%, at least 70%, at least 75% or preferably at least 90% of the surface of the pane is covered by the functional layer. However, the functional layer can also extend over smaller portions of the surface of the pane.

The metal-based functional layer is a single layer or a layer structure formed of several individual layers with a total thickness of, for example, less than or equal to 2 µm, preferably less than or equal to 1 µm. Advantageously, the metal-based functional layer has a thickness of 80 nm to 1000 nm, in particular of 80 nm to 600 nm, preferably of 120 nm to 400 nm.

The metal-based functional layer is preferably a sun protection layer with reflective properties in the infrared range and therefore in the range of solar irradiation, whereby heating of the interior of a building or motor vehicle from solar radiation is advantageously reduced. Functional layers with a sun protection effect are well-known to a person skilled in the art and typically contain at least one metal, in particular silver or a silver-containing alloy. The layer with the sun protection effect can comprise a sequence of several individual layers, in particular at least one metal layer and dielectric layers, which, for example, contain at least one metal oxide. The metal-based functional layer is particularly well protected against corrosion by the edge delayering according to the invention in combination with the protective layer.

The metal-based functional layer preferably contains at least one metal layer for example of silver, nickel, chromium, niobium, tin, titanium, copper, palladium, zinc, gold, cadmium, aluminum, silicon, tungsten or alloys thereof. The metal-based functional layer preferably comprises a metal layer such as a silver layer or a layer of a silver-containing metal alloy. Typical silver layers preferably have thicknesses of 5 nm to 18 nm, particularly preferably of 8 nm to 15 nm. The metal layer may be embedded between at least two layers of dielectric material of the metal oxide type. The metal oxide preferably contains zinc oxide, tin oxide, indium oxide, titanium oxide, silicon oxide, aluminum oxide or the like, and combinations of one or more thereof. The dielectric material preferably contains silicon nitride, silicon carbide, aluminum nitride, and combinations of one or more thereof. Such metal-based functional layers with a sun protection effect are known, for example, from WO 2007/101964 A1, DE 19927683 C1 (both LowE and sun protection), EP 1917222 B1 and DE 69731268 T2.

The metal-based functional layer has, for example, a sheet resistance of 0.1 ohm/square to 200 ohm/square, particularly preferably of 1 ohm/square to 50 ohm/square, and very particularly preferably of 1 ohm/square to 10 ohm/square.

The thickness of a metal-based functional layer with a sun protection effect can vary widely and be adapted to the requirements of the individual case, although a layer thickness of 10 nm to 5 µm and in particular 30 nm to 1 µm is preferred.

The metal-based functional layer can, for example, also be an electrically heatable layer by means of which the pane is provided with a heating function. Such heatable layers are known per se to a person skilled in the art. They typically contain one or more, for example two, three or four electrically conductive layers. These layers preferably contain or consist of at least one metal, for example silver, gold, copper, nickel and/or chromium, or a metal alloy, and preferably contain at least 90 wt. % of the metal, in particular at least 99.9 wt. % of the metal. Such layers have a particularly advantageous electrical conductivity with simultaneous high transmission in the visible spectral range. The thickness of a single layer is preferably from 5 nm to 50 nm, and particularly preferably from 8 nm to 25 nm. With such a thickness, an advantageously high transmission in the visible spectral range and a particularly advantageous electrical conductivity are achieved. These metal-based functional layers are protected particularly well from corrosion by the arrangement according to the invention.

In a preferred embodiment of the glazing according to the invention, the glazing comprises, in addition to the metal-based functional layer, an emissivity-reducing coating. The emissivity-reducing coating is an electrically conductive transparent coating. The emissivity-reducing coating can also be referred to as a coating reflecting thermal radiation, low emissivity coating, or LowE coating. Such coatings are known, for example, from WO 2013/131667 A1. Emissivity is the measure which indicates how much thermal radiation the pane emits in the installed position in comparison to an ideal heat radiator (a black body) into an interior space. The emissivity-reducing coating has the function of avoiding the irradiation of heat into the interior space (IR portions of the solar radiation and in particular the thermal radiation of the pane itself) and likewise the emission of heat from the interior space. It has reflective properties with respect to infrared radiation, in particular with respect to thermal radiation in the spectral range of 5 µm-50 µm (cf. also the standard DIN EN 12898:2019-06). This effectively improves the thermal comfort in the interior. In the case of high external temperatures and solar irradiation, the emissivity-reducing coating can very effectively at least partially reflect the thermal radiation radiated from the entire pane in the direction of the interior. At low external temperatures, the emissivity-reducing coating can effectively reflect the thermal radiation radiated from the interior and therefore reduce the effect of the cold pane as a heat sink.

The emissivity-reducing coating preferably contains at least one electrically conductive layer based on a transparent conductive oxide which provides reflective properties with respect to thermal radiation. The layer based on the transparent conductive oxide is also referred to hereinafter as a TCO layer. TCO layers are corrosion-resistant and can be used on exposed surfaces. The TCO layer is preferably formed on the basis of indium tin oxide (ITO), but can, for example, alternatively be based on indium zinc mixed oxide (IZO), aluminum-doped zinc oxide (AZO), gallium-doped zinc oxide (GZO), fluorine-doped tin oxide (FTO, $SnO_2$:F) or antimony-doped tin oxide (ATO, $SnO_2$:Sb). The emissivity-reducing coating preferably does not contain any metallic layer based on a metal. Therefore, the emissivity-reducing coating is not susceptible to corrosion.

The first pane and/or the second pane preferably contain an emissivity-reducing coating on an outer surface. The emissivity-reducing coating is preferably arranged completely over the entire outer surface. The emissivity-reducing coating is particularly preferably arranged on the outer surface of the second pane.

The metal-based functional layer and the emissivity-reducing coating are deposited by methods known per se, for example by magnetic-field-assisted cathode sputtering, which is particularly advantageous with regard to a simple, fast, cost-effective and uniform coating of the pane. The cathode sputtering is carried out in a protective gas atmosphere, for example of argon, or in a reactive gas atmosphere, for example by addition of oxygen, a hydrocarbon (for example methane) or nitrogen. However, the functional layer can also be applied by other methods known to a person skilled in the art, for example by vapor deposition or chemical vapor deposition (CVD), by atomic layer deposition (ALD), by plasma-enhanced chemical vapor deposition (PECVD) or by wet-chemical methods.

In an advantageous embodiment, the first and/or second pane contains or consists of non-prestressed, partially prestressed or prestressed glass, preferably flat glass, float glass, quartz glass, borosilicate glass, or soda lime glass. Alternatively, the panes contain or consist of clear plastics, preferably rigid clear plastics, in particular polyethylene, polypropylene, polycarbonate, polymethyl methacrylate, polystyrene, polyamide, polyester, polyvinyl chloride and/or mixtures thereof. Suitable glasses are known, for example, from EP 0847965 B1.

The thickness of the first and second panes can vary widely and be adapted to the requirements of the individual case. For vehicle glazings, panes with a thickness of 1.4 mm to 2.5 mm are preferably used, for example with the standard thicknesses of 1.6 mm or 2.1 mm. The size of the pane can vary and depends on the use.

The glazing and therefore the first pane and the second pane can have any three-dimensional shape. The vehicle glazing according to the invention is preferably curved in one or more directions of the space as is usual for motor vehicle panes, with typical radii of curvature being in the range of approximately 10 cm to approximately 40 m. However, the glazing can also be flat, for example if it is provided as a pane for buses, trains or tractors.

The first pane, the second pane and the thermoplastic intermediate layer can be clear and colorless, tinted or colored independently of one another. The thermoplastic intermediate layer is colored at least sectionally.

The thermoplastic intermediate layer contains at least one thermoplastic polymer, preferably ethylene vinyl acetate (EVA), polyvinyl butyral (PVB) or polyurethane (PU), or mixtures or copolymers or derivatives thereof, particularly preferably PVB, very particularly preferably polyvinyl butyral (PVB), and additives known to a person skilled in the art, for example plasticizers. The intermediate layer is typically formed from a thermoplastic film. The thickness of the intermediate layer is preferably from 0.2 mm to 2 mm, particularly preferably from 0.3 mm to 1 mm.

The thermoplastic intermediate layer can be formed by a single film or also by more than one film. To improve the acoustically damping properties of a composite pane, a three-layer thermoplastic intermediate layer comprising an acoustically damping layer arranged between two thermoplastic layers is preferably laminated between the two panes of the glazing. The acoustically damping layer is preferably thinner than 300 µm (micrometers). The thickness of the acoustically damping layer is in particular 70 µm to 130 µm, for example 100 µm.

Vehicle glazing according to the invention can additionally comprise a covering print, in particular consisting of a dark, preferably black, enamel. The covering print is in particular a peripheral, i.e., frame-like, covering print. The peripheral covering print serves primarily as UV protection for the assembly adhesive of the composite pane. The covering print can be opaque and formed over the entire surface. The covering print can also be designed to be at least sectionally semi-transparent, for example as a dot raster, strip raster or checkered raster. Alternatively, the covering print can also have a gradient, for example from an opaque covering to a semi-transparent covering. The covering print is usually applied on the interior-side surface of the pane which represents the outer pane in the installed position, or on the interior-side surface of the pane which represents the inner pane in the installed position.

It is preferred that the first pane and the second pane do not comprise a covering print, at least in the region of the tinted region. This means that none of the surfaces of the first and second panes have a covering print that is applied over the tinted region. The tinted region of the thermoplastic intermediate layer takes over the function of the covering print in this region of concealing the transition between the coating-free edge region and the metal-based functional layer. This is particularly easy during production. In addition, thermal stresses in the panes are avoided which can be caused by the dark covering prints during the bending and prestressing process at high temperatures. Very particularly preferably, the first pane and the second pane do not have any covering print at all.

In a preferred embodiment, the vehicle glazing is a motor vehicle pane. The vehicle pane is provided to separate the interior from the external environment in a window opening of a vehicle. Within the meaning of the invention, inner pane denotes the pane of the vehicle pane facing the vehicle interior. Outer pane denotes the pane facing the external environment. The vehicle glazing is preferably a side pane of a motor vehicle, preferably a side pane to be opened or a free-standing side pane, since the visible edge of the pane is particularly aesthetically pleasing in this case due to the omission of a covering print.

In a preferred embodiment of the motor vehicle pane, the first pane is the outer pane, and the second pane is the inner pane of the vehicle. The metal-based functional layer is preferably a sun protection coating or a heatable coating with at least one metal layer, preferably with at least one silver layer. By being applied to the outer pane, these coatings can act effectively since the sun is reflected directly on the outer pane, or the outer pane can be heated and de-iced. Alternatively, preferably the first pane is the inner pane and the second pane is the outer pane of the vehicle.

Particularly preferably, the first pane is the outer pane and the metal-based functional layer is a sun protection coating and, additionally, an emissivity-reducing coating is arranged on the outer surface of the inner pane (second pane). The emissivity-reducing coating in combination with the sun protection coating maximizes the comfort for the vehicle occupant.

If a first layer is arranged above a second layer, this means, within the meaning of the invention, that the first layer is arranged further away from the substrate on which the coating is applied than the second layer. If a first layer is arranged below a second layer, this means, within the meaning of the invention, that the second layer is arranged further away from the substrate than the first layer.

The invention further extends to a method for producing the glazing according to the invention. The above statements in conjunction with the glazing apply equally to the method according to the invention, and vice versa.

The method comprises providing a first pane, a second pane and a thermoplastic intermediate layer with a colored region and a transparent region.

The method further comprises applying a metal-based functional layer to the surface of the first pane provided as an inner surface. The metal-based functional layer is preferably applied in a vacuum-based coating method. Suitable vacuum-based coating methods are, for example, CVD (chemical vapor deposition) or PVD (physical vapor deposition), preferably cathode sputtering ("sputtering"), particularly preferably magnetic-field-assisted cathode sputtering ("magnetron sputtering"), and are known to a person skilled in the art. The metal-based functional coating is usually deposited completely over the entire surface of the first pane provided as an inner surface. The first pane can optionally be provided with one or more pre-coatings before the metal-based functional layer is applied. However, it is preferred that the metal-based functional layer is applied directly to the uncoated pane.

The method further comprises removing the metal-based functional layer in an edge region extending from a side edge of the first pane over at least 5 mm to at most 25 mm. This edge region is realized in the finished glazing as a coating-free edge region. The functional layer can removed in various ways, preferably by means of laser processing, abrasively by mechanical delayering (preferably a grinding process), by using a mask during the application of the functional layer, or by prior application of a sacrificial layer which is decomposed in a downstream process step at elevated temperature and is removed together with the functional layer. Particularly preferably, the functional layer is removed by means of laser processing since this achieves particularly good results and can be easily incorporated into the process.

The method according to the invention further comprises providing a thermoplastic intermediate layer with a colored region which is at least as large as the coating-free edge region, and a transparent region. Production methods for producing thermoplastic intermediate layers with a color strip are known to a person skilled in the art and are disclosed, for example, in DE 102004013201 A1, EP 0897787 A2 and DE 102010019941 A1.

The method according to the invention further comprises the production of the glazing from the individual components. For this purpose, a stack is first formed from a first pane, second pane and thermoplastic intermediate layer. The thermoplastic intermediate layer is arranged between the first pane and the second pane so that the inner surface of the first pane faces the thermoplastic intermediate layer. The thermoplastic intermediate layer is oriented in such a way that the colored region is arranged congruent with the coating-free edge region.

Subsequently, the first pane and the second pane are connected via the thermoplastic intermediate layer preferably under the effect of heat, vacuum and/or pressure. The two panes are therefore connected (laminated) to one another by the thermoplastic intermediate layer. Preferably, the steps are carried out in the sequence as indicated. Alternatively, a change in the sequence is also possible.

Methods known per se for producing the glazing from the panes and the thermoplastic intermediate layer can be used. For example, so-called autoclave methods can be carried out at an elevated pressure of about 10 bar to 15 bar and temperatures of 130° C. to 145° C. over about 2 hours. Vacuum bag or vacuum ring methods known per se operate for example at approximately 200 mbar and 130° C. to 145° C. The two panes and the thermoplastic intermediate layer can also be pressed in a calender between at least one roller pair to form a composite pane. Systems of this type are known for the production of composite panes and usually have at least one heating tunnel upstream from a pressing facility. The temperature during the pressing process is, for example, from 40° C. to 150° C. Combinations of calendering and autoclaving methods have proven to be particularly successful in practice. Alternatively, vacuum laminators can be used. These consist of one or more heatable and evacuable chambers in which the first pane and the second pane can be laminated within, for example, approximately 60 minutes at reduced pressures of 0.01 mbar to 800 mbar and temperatures of 80° C. to 170° C.

The method preferably comprises a temperature treatment of the first pane at temperatures of 400° C. to 700° C., preferably of 550° C. to 650° C. This temperature treatment is carried out for curved glazing preferably within the context of the bending step of the pane. Preferably, the first and the second pane are bent together (i.e. at the same time and by the same tool) congruently, because as a result, the shapes of the panes for the subsequent lamination are optimally matched to one another.

In a preferred embodiment, the thermoplastic intermediate layer is produced by co-extrusion. In this case, a melt which contains a color pigment is produced for the colored region of the intermediate layer, and a melt which contains less or preferably no color pigment is produced for the transparent region of the intermediate layer. In an extrusion die, these two melt flows are extruded together via two nozzles so that an intermediate layer with the colored region and the transparent region is produced, as described, for example, in DE 102004013201 A1. This method leads to thermoplastic intermediate layers having a defined, uniform thickness and visually seamless color gradient.

In a further preferred embodiment, a transparent thermoplastic intermediate layer and a colored thermoplastic intermediate layer are joined together after extrusion. This can be done by heating and under pressure or with the aid of primers which produce the adhesion between two thermoplastic layers.

In a further preferred embodiment, a transparent thermoplastic intermediate layer is produced, and the colored region is produced by superficial coloring. For this purpose, a dye is applied to one or both surfaces of the thermoplastic intermediate layer. This can be achieved by printing, brushing, spraying or rolling. This method can be used in many ways and can be employed flexibly for different pane designs.

The glazing according to the invention is preferably used in means of transportation for traffic on land, in the air or in water, in particular in trains, ships and motor vehicles, for example as a front windshield, rear windshield, side pane and/or roof pane. Particularly preferably, the glazing is used in motor vehicles, very particularly preferably as a side pane.

The various embodiments of the invention can be implemented individually or in any combinations. In particular, the features mentioned above and to be explained below can be used not only in the specified combinations but also in other combinations or in isolation, without departing from the scope of the present invention.

In the following, the invention is explained in more detail with reference to drawings and embodiments. The drawings are schematic representations and not to scale. The drawings do not limit the invention in any way.

Figure 1:
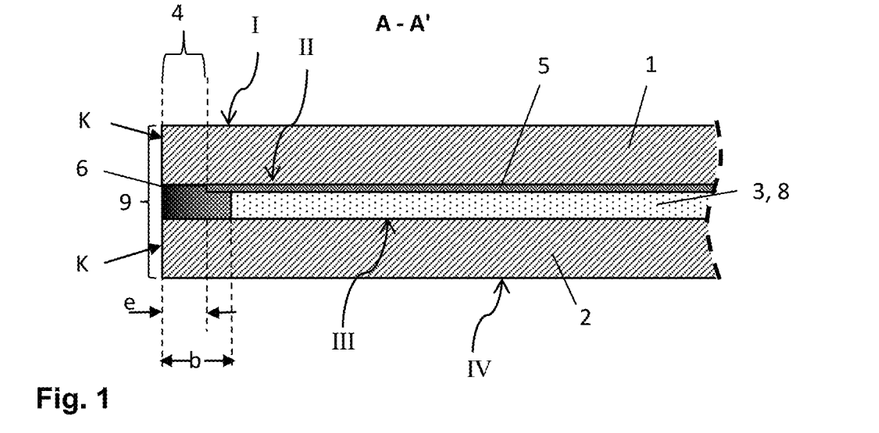
FIGS. 1, 2, and 3 each show an embodiment of a cross section through the glazing from FIG. 4a along the line A-A', FIG. 4a, b each show a schematic plan view of an embodiment of a glazing according to the invention.
Figure 2:
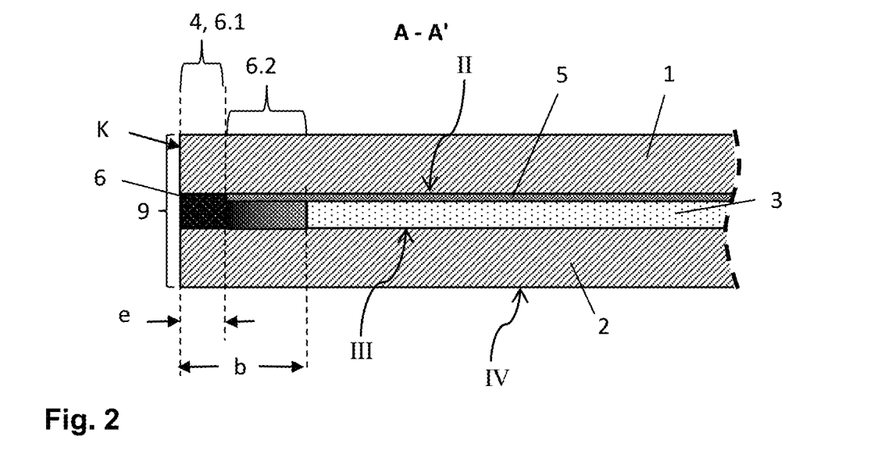
Figure 3:
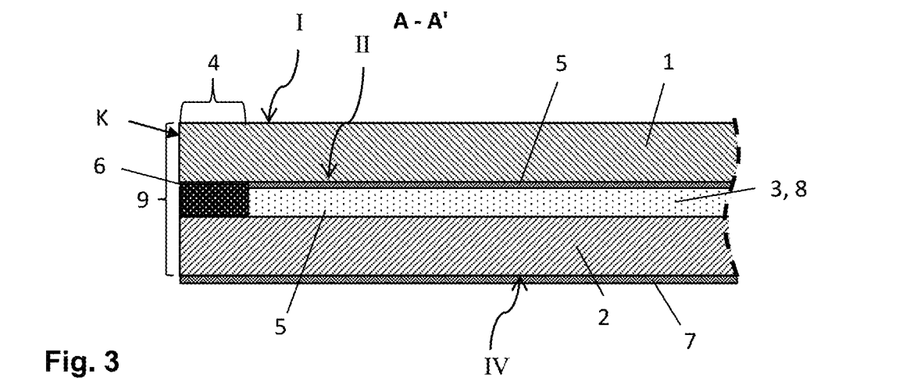
Figure 4A:
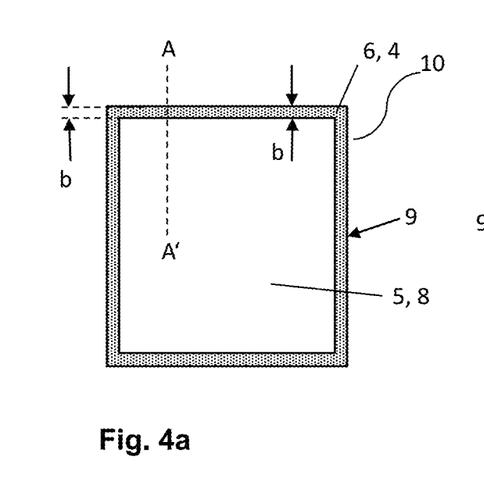
Figure 4B:
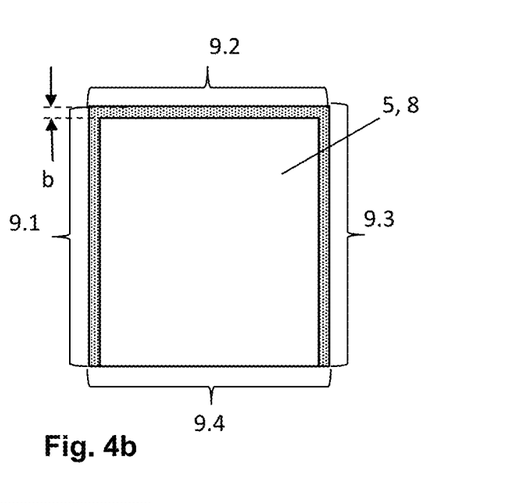

FIGS. 4a and 4b each show a schematic plan view of an embodiment of a glazing 10 according to the invention, and FIGS. 1, 2 and 3 show a possible embodiment of a cross section of FIG. 2a along the line of intersection A-A'.

The embodiment of the glazing 10 according to the invention shown in FIG. 1 has a first pane 1 with an inner surface II and an outer surface I and a peripheral side edge K. The glazing 10 comprises a second pane 2 with an inner surface III and an outer surface IV and a peripheral side edge K. The first pane 1 is connected to the second pane 2 via a thermoplastic intermediate layer 3. The inner surface II of the first pane 1 and the inner surface III of the second pane 2 face the thermoplastic intermediate layer 3. The vehicle glazing 10 has a peripheral pane edge 9 which, in cross section, is composed of the pane edges K of the first and of the second pane 1, 2 and of the thermoplastic intermediate layer 3.

The first pane 1 consists, for example, of lime-soda glass and has a thickness of 2.1 mm. The second pane 2 consists, for example, of lime-soda glass and has a thickness of 1.6 mm. The thermoplastic intermediate layer 3 is formed, for example, made from a PVB film 0.76 mm thick.

The first pane 1 preferably represents the outer pane, and the second pane 2 represents the inner pane of the glazing formed as a composite pane. This arrangement is particularly advantageous due to the position of the metal-based functional layer 5 with a sun protection function on the first pane 1, since the second pane 2 heats up to a lesser extent, which results in less heating of the interior. Alternatively, the first pane 1 can also represent the inner pane and the second pane 2 can represent the outer pane.

A metal-based functional layer 5 is arranged on the inner surface II of the first pane 1. The metal-based functional layer 5 is, for example, a coating that reflects IR radiation with three conductive silver layers and dielectric layers arranged therebetween, and has a total thickness of approximately 280 nm. The metal-based functional layer 5 is arranged on the entire inner surface II of the first pane 1 with the exception of a coating-free edge region 4 with the width e. In this coating-free edge region 4, the metal-based functional layer 5 has been removed or has not been applied. This edge region 4 without a coating ensures that corrosion of the metal-based functional layer 5 does not occur. If the metal-based functional layer 5 were to extend up to the side edge K, moisture which can penetrate in the region of the pane edge 9 could lead to corrosion. In order to avoid this, the coating-free edge region 4 is free of the functional layer 5 according to the invention. The width of the coating-free edge region 4 is measured from the side edge K of the first pane 1 up to the functional layer 5 and is, for example, e=8 mm. The coating-free edge region 4 protects against corrosion in the region of the pane edge since the moisture no longer diffuses beyond the thermoplastic intermediate layer 3 to the metal-based functional layer 5 and no longer leads there to corrosion of the metal-based functional layer 5.

The thermoplastic intermediate layer 3 in FIG. 1 consists of a colored region 6 at the edge of the glazing and a transparent region 8 which is arranged in the direction of the center of the pane. The transparent region 8 consists of PVB without admixed dye. The colored region 6 is blue-green and has a linear color gradient. This means that the colored region 6 is variably colored, wherein the light transmission increases linearly from the side edge K towards the center of the pane. This leads to an aesthetically pleasing transition to the transparent region 8 of the intermediate layer. Measured from the side edge, the variably colored region 6 extends to b=80 mm and therefore projects far beyond the coating-free edge region 4. In the region of the transition of coating-free edge region 4 to metal-based functional layer 5 at e=8 mm, the coloration of the thermoplastic intermediate layer 3 is very dark, and therefore the transition is effectively covered. This is particularly advantageous in the case of panes of which the edge region in the installed state is not covered by broad frames or covering prints. The 80 mm-wide region 6 offers good protection from the sun and therefore increases comfort. The colored region 6 is arranged in the form of an 80 mm-wide strip along the peripheral pane edge 9.

No covering print is shown in FIG. 1. Depending on the application, masking layers or covering prints on the first and/or second pane are of course possible. However, it is preferred that no covering print is arranged in the colored region 6, as shown.

FIG. 2 shows another possible embodiment of a glazing 10 according to the invention. FIG. 2 differs from FIG. 1 only in the design of the colored region 6. The colored region 6 consists in this case of a uniformly colored region 6.1 and a variably colored region 6.2. The width of the uniformly colored region 6.1 corresponds exactly to the width e=8 mm of the coating-free edge region 4. The uniformly colored region directly borders the pane edge 9. The uniformly colored region 6.1 and the coating-free edge region 4 are therefore arranged congruently when looking through the composite pane. The transition from coating-free edge region 4 to metal-based functional layer 5 is therefore particularly well concealed since only the transition from the variably colored region 6.2 to the uniformly colored region 6.1 is perceived. In the variably colored region 6.2, the light transmission increases linearly from the side edge K towards the center of the pane, so that an visually pleasing transition from the dark-colored edge to the transparent center of the pane is produced. The variably colored region 6.2 extends, measured from the pane edge 9, to 100 mm in the direction of the center of the pane. The variably colored region 6.2 therefore extends, measured from the edge of the functional layer 5, to 92 mm in the direction of the center of the pane.

FIG. 3 shows a further embodiment of a glazing 10 according to the invention. The glazing is substantially the same as shown in FIG. 1. It differs in the design of the colored region 6 and, in addition, an emissivity-reducing coating 7 is arranged on the outer surface IV of the second pane 2. It comprises a conductive ITO layer together with dielectric layers. The emissivity-reducing coating 7 on the second pane 2 further reduces the input of thermal radiation into the interior space. The thermal comfort in combination with the sun protection coating 5 on the first pane 1 is therefore further increased. No coating-free edge region 4 is necessary on the second pane 2 since the emissivity-reducing coating 7 is not sensitive to corrosion. The thermoplastic intermediate layer 3 consists of a transparent region 8 and a colored region 6, the colored region 6 being homogeneously colored blue-green. The homogeneously colored region 6 is arranged congruently with respect to the coating-free edge region 4 and has a width of 8 mm. Accordingly, only the difference in the coloration of the thermoplastic intermediate layer is perceived, but not the transition from metal-based functional layer 5 to coating-free edge region 4. No covering print is required on one of the two panes 1 and 2, which simplifies production and prevents negative effects of a temperature treatment for bending and prestressing the panes.

FIG. 4a and FIG. 4b show two possible embodiments of a glazing according to the invention in plan view.

FIG. 4a shows a pane with a coating-free edge region 4 and a colored region 6 of width b in the from of a frame, which are formed along the entire peripheral pane edge 9 according to the present invention. Details relating to possible embodiments of the edge region can be found in the description of FIGS. 1 to 3. An advantage of this design is that the pane is peripherally protected against corrosion, and the transition from coating-free edge region 4 to the metal-based functional layer 5 is no longer perceived by the viewer through the colored region 6. In addition, a particularly effective anti-glare effect is achieved since a colored region peripherally protects against the sun.

FIG. 4b shows a pane with a coating-free edge region 4 and a colored region 6 of width b which are in three edge sections, 9.1, 9.2 and 9.3 of the peripheral pane edge 9 according to the present invention. No colored region 6 is shown in the edge section 9.4. For example, a covering print can be arranged here which is concealed after installation at the designated location of frame components. Such an embodiment is particularly suitable, for example, for a movable or a free-standing side pane of a vehicle in which the lower edge disappears in the body and therefore does not have to be designed to be visually pleasing.

Figure 5:
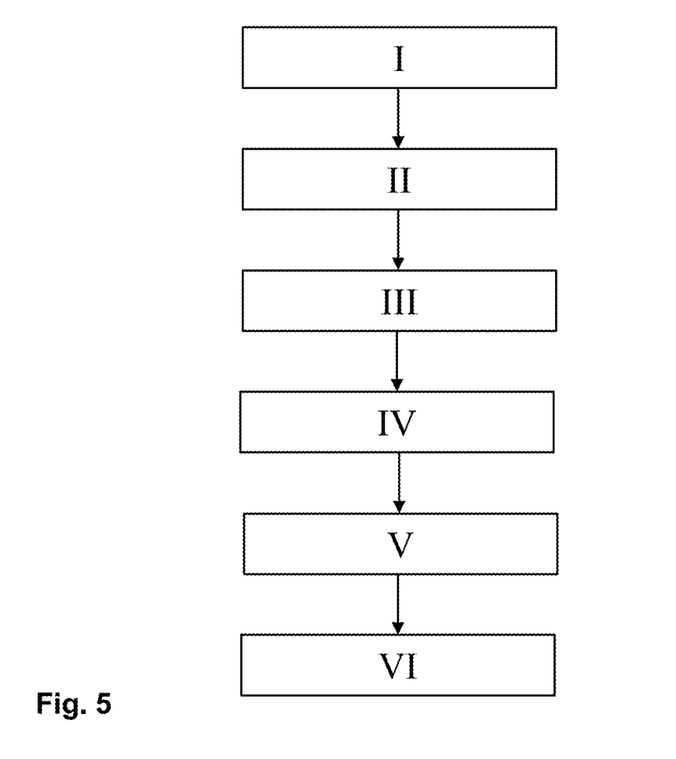
FIG. 5 shows a flowchart of an embodiment of a method according to the invention.

FIG. 5 shows a flow diagram of a possible method according to the invention.

I. Firstly, a first pane 1 is provided which has a surface I provided as an outer surface, and a surface II provided as an inner surface, and a peripheral side edge K. Furthermore, a second pane 2 is provided which has a surface provided as an outer surface IV, and a surface provided as an inner surface III, and a peripheral side edge K.

II. A metal-based functional layer 5 is then deposited over the entire surface of the surface II of the first pane 1, provided as an inner surface, by means of magnetic-field-assisted cathode sputtering. The metal-based functional layer is, for example, a sun protection coating which reflects IR radiation and comprises three silver layers and at least four dielectric layers.

III. A coating-free edge region 4 is produced either by masking during the deposition process or, for example, by laser delayering after the deposition process. The coating-free edge region 4 has, for example, a width e of 8 mm.

IV. A thermoplastic intermediate layer 3 with a colored region 6, which is at least as large as the coating-free edge region 4, is produced for example by co-extrusion of PVB without dye and with PVB with dye.

V. The first pane 1, the thermoplastic intermediate layer 3 and the second pane 2 are stacked flat one above the other so that the inner surface II of the first pane 1 faces the thermoplastic intermediate layer 3, and the colored region 6 is arranged congruently with the coating-free edge region 4.

VI. In a last step, the coated first pane 1 is connected and laminated via the thermoplastic intermediate layer 3 to the second pane 2, for example in an autoclave process.

LIST OF REFERENCE SIGNS 10 vehicle glazing
1 first pane, outer pane
2 second pane, inner pane
3 thermoplastic intermediate layer
4 coating-free edge region on an inner surface
5 metal-based functional layer
6 colored region of the thermoplastic intermediate layer
6.1 uniformly colored region
6.2 variably colored region
7 emissivity-reducing coating
8 transparent region of the thermoplastic intermediate layer
9 peripheral pane edge
9.1, 9.2, 9.3, 9.4 edge sections of the pane
K side edge of the first or second pane
I outer surface of the first pane 1 facing away from the intermediate layer 3
II inner surface of the first pane 1 facing the intermediate layer 3
III inner surface of the second pane 2 facing the intermediate layer 3
IV outer surface of the second pane 2 facing away from the intermediate layer 3

The invention claimed is:
1. A vehicle glazing comprising:
a first pane and a second pane which are connected to one another via a thermoplastic intermediate layer which is sectionally colored,
a metal-based functional layer which is deposited on an inner surface of the first pane facing the thermoplastic intermediate layer, and a coating-free edge region on the inner surface of the first pane, which is free of metal-based functional layer and which extends from a side edge of the first pane over at least 5 mm to at most 25 mm on the inner surface, wherein the thermoplastic intermediate layer comprises a transparent region and a colored region, the colored region being arranged at least in the entire coating-free edge region.

2. The vehicle glazing according to claim 1, wherein the colored region extends beyond the coating-free edge region and extends from the side edge of the first pane to at most 150 mm.

3. The vehicle glazing according to claim 1, wherein the colored region consists of a uniformly colored region and a variably colored region, the uniformly colored region directly adjoining the side edge.

4. The vehicle glazing according to claim 3, wherein the uniformly colored region is arranged congruently with the coating-free edge region.

5. The vehicle glazing according to claim 1, wherein the coating-free edge region extends from the side edge at least 5 mm to at most 20 mm.

6. The vehicle glazing according to claim 1, wherein the vehicle glazing comprises a peripheral pane edge, and the colored region is arranged in sections along the peripheral pane edge.

7. The vehicle glazing according to claim 1, wherein the vehicle glazing comprises a peripheral pane edge, and the coating-free edge region and the colored region extend as a frame along the entire peripheral pane edge.

8. The vehicle glazing according to claim 1, wherein the first pane and the second pane do not comprise any covering print, at least in the colored region.

9. The vehicle glazing according to claim 1, wherein the metal-based functional layer contains at least one metal layer, and is designed to reflect incident infrared light.

10. The vehicle glazing according to claim 1, wherein the vehicle glazing is a motor vehicle pane, and the first pane is the outer pane, and the second pane is the inner pane of the vehicle glazing.

11. A method for producing a vehicle glazing according to claim 1, comprising:

providing a first pane and a second pane, applying a metal-based functional layer to a surface of the first pane provided as an inner surface, removing the metal-based functional layer in an edge region extending from a side edge of the first pane over 5 mm to at most 25 mm, providing a thermoplastic intermediate layer with a colored region which is at least as large as the coating-free edge region, forming a stack from the first pane, the second pane and, in-between, the thermoplastic intermediate layer so that the inner surface of the first pane faces the thermoplastic intermediate layer, and the colored region is arranged congruently with the coating-free edge region, and connecting the first pane, the second pane and the thermoplastic intermediate layer under the effect of heat, vacuum and/or pressure.

12. The method according to claim 11, wherein the thermoplastic intermediate layer is provided with a colored region by co-extruding a melt flow with color pigment for the colored region and a melt flow without color pigment for the transparent region.

13. The method according to claim 11, wherein the thermoplastic intermediate layer is provided with a colored region by coloring the surface of the thermoplastic intermediate layer in the colored region.

14. The method according to claim 11, wherein the metal-based functional layer is removed in the coating-free edge region by mechanical delayering, laser delayering or removal of a masking layer applied during the application of the metal-based functional layer.

15. A method comprising providing a vehicle glazing according to claim 1 in a vehicle of transportation for traffic on land, in the air or in water.

16. The vehicle glazing according to claim 2, wherein the colored region extends from the side edge of the first pane to at most 100 mm.

17. The vehicle glazing according to claim 5, wherein the coating-free edge region extends from the side edge at least 6 mm to at most 15 mm.

18. The vehicle glazing according to claim 10, wherein the motor vehicle pane is a side pane or roof pane of a motor vehicle.

19. The method according to claim 14, wherein the metal-based functional layer is removed in the coating-free edge region by a grinding process.

20. The method according to claim 15, wherein the vehicle glazing is a rear window, side pane and/or roof pane of the vehicle.

21. The vehicle glazing according to claim 1, wherein the colored region is arranged at least in the entire coating-free edge region from the inner surface of the first pane to the inner surface of the second pane.

\* \* \* \* \*